US012693921B2

(12) United States Patent
Nair et al.

(10) Patent No.: US 12,693,921 B2
(45) Date of Patent: Jul. 28, 2026

(54) SIMPLIFIED CONFIGURATION OF NETWORK POLICY

(71) Applicant: Arista Networks, Inc., Santa Clara, CA (US)

(72) Inventors: Anoop Kumaran Nair, Thrikkakara (IN); Venkatesh Ramachandran, Bengaluru (IN); Rajesh Kumar Ganapathy Achari, Perumbavoor (IN); Rajarao Bhagya Prasad Nittur, Milpitas, CA (US); Krishna Prabhakar, Los Altos Hills, CA (US)

(73) Assignee: Arista Networks, Inc., Santa Clara, CA (US)

( * ) Notice: Subject to any disclaimer, the term of this patent is extended or adjusted under 35 U.S.C. 154(b) by 46 days.

(21) Appl. No.: 18/643,837

(22) Filed: Apr. 23, 2024

(65) Prior Publication Data

US 2024/0414059 A1     Dec. 12, 2024

(30) Foreign Application Priority Data

Jun. 12, 2023    (IN) .............................. 202341039926

(51) Int. Cl.
| | |
|---|---|
| *G06F 11/07* | (2006.01) |
| *G06F 11/22* | (2006.01) |
| *G06F 16/242* | (2019.01) |
| *G06F 16/245* | (2019.01) |
| *G06F 40/295* | (2020.01) |

(Continued)

(52) U.S. Cl.
CPC ........ *G06F 11/0709* (2013.01); *G06F 11/079* (2013.01); *G06F 11/0793* (2013.01); *G06F 11/2257* (2013.01); *G06F 16/242* (2019.01); *G06F 16/245* (2019.01); *G06F 40/295*

(2020.01); *G06F 40/40* (2020.01); *G06N 5/022* (2013.01); *H04L 9/0825* (2013.01); *H04L 41/0806* (2013.01); *H04L 41/0893* (2013.01); *H04L 41/0894* (2022.05); *H04L 41/0895* (2022.05); *H04L 41/145* (2013.01); *H04L 41/149* (2022.05); *H04L 41/28* (2013.01); *H04L 43/0876* (2013.01); *H04L 63/0823* (2013.01); *H04L 63/083* (2013.01); *H04L 63/0876* (2013.01); *H04L 63/10* (2013.01); *H04L 63/102* (2013.01)

(58) Field of Classification Search
None
See application file for complete search history.

(56) References Cited

U.S. PATENT DOCUMENTS

| | | | | |
|---|---|---|---|---|
| 2009/0157852 A1* | 6/2009 | Krupkin | .............. | H04L 41/5054 709/220 |
| 2016/0117184 A1* | 4/2016 | Sundaresan | ......... | G06F 9/45558 718/1 |

(Continued)

*Primary Examiner* — Quang N Nguyen
(74) *Attorney, Agent, or Firm* — Treyz Law Group, P.C.; Tianyi He

(57) ABSTRACT

A network management server may provide options via a user interface for configuring a network and a network policy for the network. The network management server may identify values for network attributes based on the user-selected option(s). The network management server may maintain network entity attribute information and use the network entity attribute information to populate the selectable options based on which conditions and/or actions for the network policy are defined.

20 Claims, 10 Drawing Sheets

(51) Int. Cl.

| | |
|---|---|
| *G06F 40/40* | (2020.01) |
| *G06N 5/022* | (2023.01) |
| *H04L 9/08* | (2006.01) |
| *H04L 9/40* | (2022.01) |
| *H04L 41/0806* | (2022.01) |
| *H04L 41/0893* | (2022.01) |
| *H04L 41/0894* | (2022.01) |
| *H04L 41/0895* | (2022.01) |
| *H04L 41/14* | (2022.01) |
| *H04L 41/149* | (2022.01) |
| *H04L 41/28* | (2022.01) |
| *H04L 43/0876* | (2022.01) |

(56) References Cited

U.S. PATENT DOCUMENTS

| | | | |
|---|---|---|---|
| 2016/0211988 A1* | 7/2016 | Lucas | H04L 45/302 |
| 2016/0344588 A1* | 11/2016 | Xie | H04L 63/104 |
| 2024/0211496 A1* | 6/2024 | Polaczuk | G06N 3/045 |

* cited by examiner

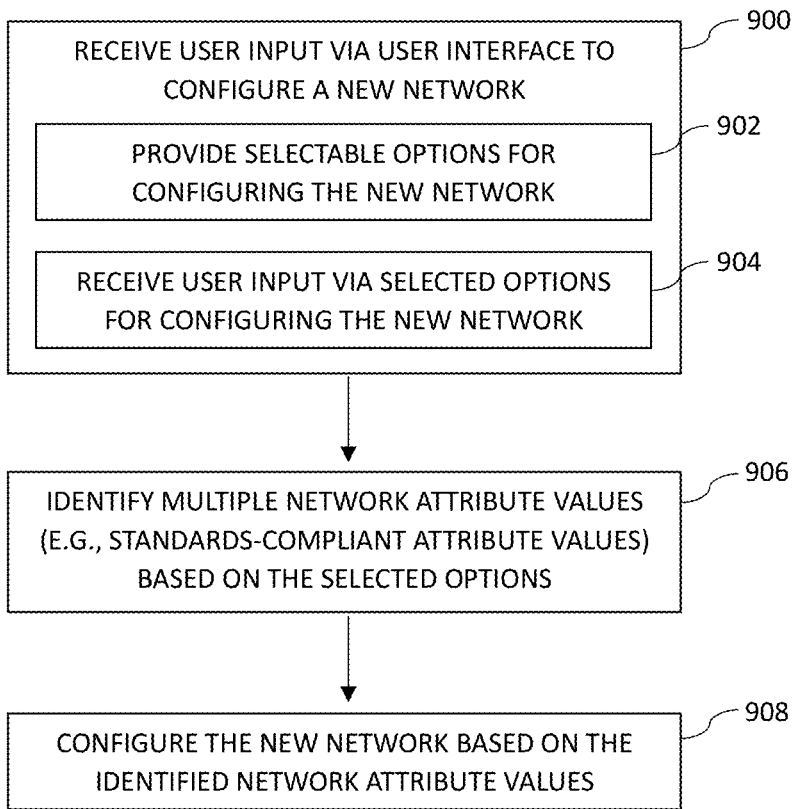

RECEIVE USER INPUT VIA USER INTERFACE TO CONFIGURE A NEW NETWORK — 900

PROVIDE SELECTABLE OPTIONS FOR CONFIGURING THE NEW NETWORK — 902

RECEIVE USER INPUT VIA SELECTED OPTIONS FOR CONFIGURING THE NEW NETWORK — 904

IDENTIFY MULTIPLE NETWORK ATTRIBUTE VALUES (E.G., STANDARDS-COMPLIANT ATTRIBUTE VALUES) BASED ON THE SELECTED OPTIONS — 906

CONFIGURE THE NEW NETWORK BASED ON THE IDENTIFIED NETWORK ATTRIBUTE VALUES — 908

FIG. 9

OBTAIN NETWORK ENTITY ATTRIBUTE INFORMATION FROM AN ATTRIBUTE DATABASE (E.G., POPULATED USING EXTERNAL PLATFORMS) — 1000

POPULATE OPTIONS FOR CONDITIONS AND/OR ACTIONS OF A NETWORK POLICY USING THE NETWORK ENTITY ATTRIBUTE INFORMATION — 1002

RECEIVE USER INPUT VIA USER INTERFACE TO CONFIGURE THE NETWORK POLICY BASED ON SELECTED CONDITIONS AND/OR ACTIONS — 1004

SIMPLIFIED CONFIGURATION OF NETWORK POLICY

This application claims the benefit of Indian Provisional Patent Application No. 20/2341039926, filed Jun. 12, 2023, which is hereby incorporated by reference herein in its entirety.

BACKGROUND

This relates to a communication network, and more particularly, to configuring networks and network policies for the networks.

In one illustrative system, a network can include network devices that convey network traffic between hosts. Networks and corresponding policies configured by a network administrator can help manage the operation of the networks in a desired manner, such as using network segmentation policies.

BRIEF DESCRIPTION OF THE DRAWINGS

FIG. 9 is a flowchart of illustrative operations for configuring a network based on selectable options that correspond to network attributes in accordance with some embodiments.

DETAILED DESCRIPTION

Figure 1:
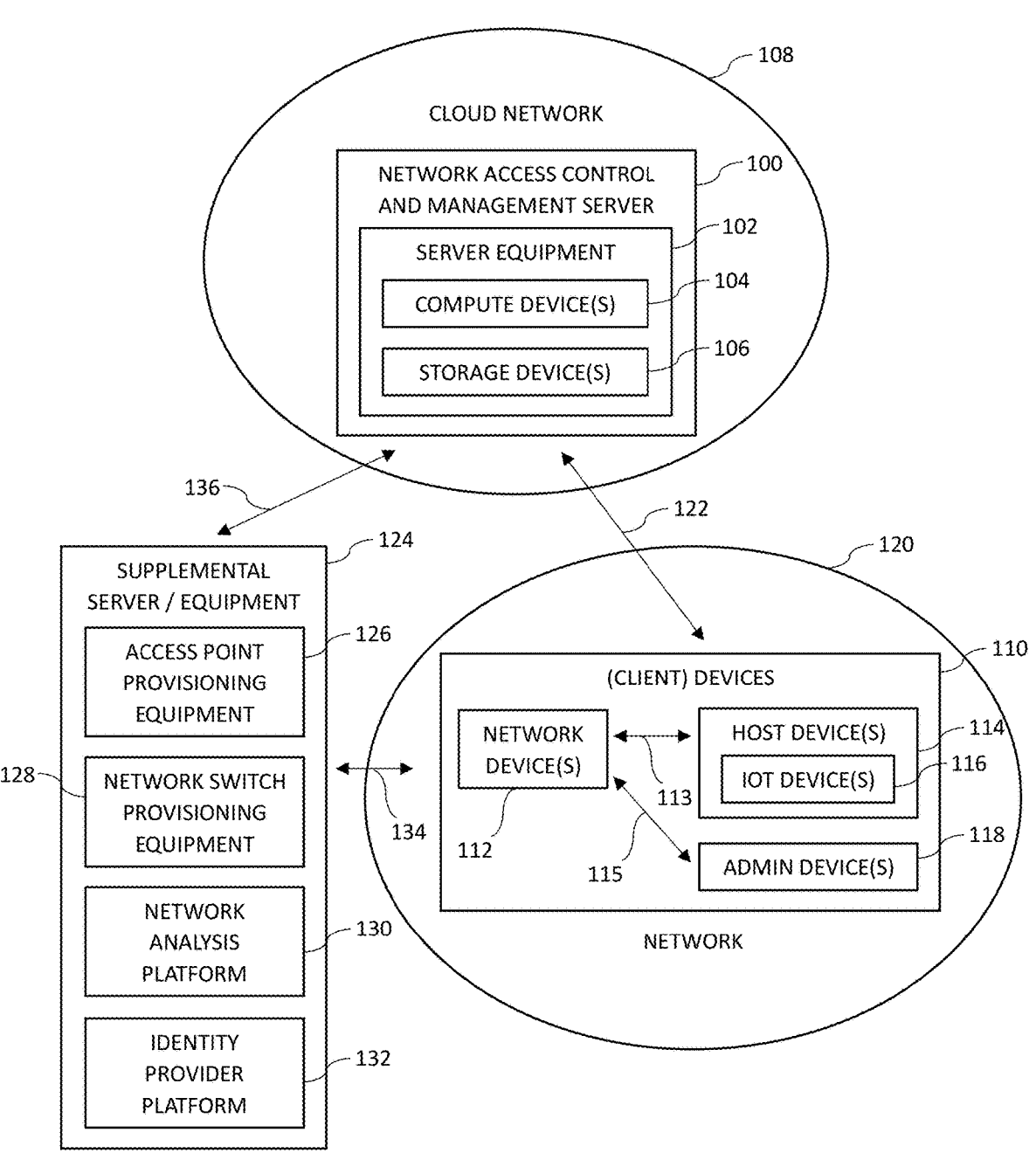
FIG. 1 is a diagram of an illustrative system for network and network policy management in accordance with some embodiments.

A network can convey network traffic, e.g., in the form of frames, packets, etc., between hosts. The hosts may be coupled to intervening network devices of the network that forward the network traffic. The network and the devices therein may be managed using management equipment. In particular, the management equipment may receive network configuration and network policy configuration information from administrator computing devices based on which networks and corresponding network policies are defined and applied. However, the manner in which administrator computing devices provide network and network policy information can be complex and/or non-intuitive, e.g., to administrators without certain knowledge. Accordingly, it may be desirable to provide an intuitive interface by which administrators operating administrator devices can configure networks and corresponding network policies in a simplified manner.

In some illustrative configurations described herein as illustrative examples, a networking system may include a network management server (sometimes referred to as a network access control and management server) that facilitates configuration of networks and network policies for the networks (e.g., define networks, define segmentation network policies such as virtual local area networks (VLANs) memberships and actions, access control lists (ACLs), etc., for the defined networks).

In particular, the management server may provide a user interface by which user-selectable options for configuring wired and/or wireless networks can be presented as user output and through which user-selected options for configuring the networks can be received as user input. The user input (e.g., user selected options or user-input text) can be used to identify actual network attributes such as standards-related or standards-compliant attributes (e.g., Remote Authentication Dial-In User Service (RADIUS) protocol attributes and/or other protocol or standards-based attributes). These attributes may be used to configure the networks without the user being exposed to these more complex attributes and/or without the user having certain knowledge about the underlying protocols and/or standards.

The management server may also maintain network entity attribute information (e.g., different types of entity attributes, different values for the attributes of the network entities such as devices, users, networks, etc.). These network entity attributes and their values may be obtained from external sources (e.g., network device provisioning and/or management equipment, user identity provider platforms, network security platforms, and/or other sources of entity attribute information). The user interface may provide selectable options including the network entity attributes and their values as options for defining network policies (e.g., conditions for network policies, actions for network policies, etc.). The management server may apply the network policies and take appropriate actions corresponding to the network policies (e.g., by assignment to a VLAN, an ACL, a pre-defined segment, and/or other network segmentation-based group, by conveying network policy information to network devices, to supplemental equipment, etc.). In such a manner, the user or administrator can configure network policies by interacting with pre-populated network entity attributes and values in an intent-based approach. This omits the need for the user to have certain pre-existing knowledge about the network entities and/or knowledge about translating the desired attribute-based network policy into corresponding policy objects (or other programming parameters) to define the network policy.

An illustrative networking system in which a management system for network configuration and network policy configuration may be implemented is shown in FIG. 1. In the example of FIG. 1, the illustrative networking system may include a server such as server 100. Server 100 may be formed from server equipment 102 containing any suitable number of compute devices 104 and any suitable number of storage devices 106, among other components.

As an example, server equipment 102 may include server hardware such as blade servers, rack servers, and/or tower servers. Configurations in which server equipment 102 includes rack servers mounted to racks in a server chassis or enclosure are sometimes described herein as an illustrative example. Each of compute devices 104 and/or storage devices 106 may be provided as part of the server hardware (e.g., as part of the rack servers).

Compute devices 104 may include one or more processors or processing units based on central processing units (CPUs), based on graphics processing units (GPUs), based on microprocessors, based on general-purpose processors, based on host processors, based on microcontrollers, based on digital signal processors, based on programmable logic devices such as field programmable gate array (FPGA) devices, based on application specific system processors (ASSPs), based on application-specific integrated circuit (ASIC) processors, and/or based on other processor architectures. Storage devices 106 may include volatile memory such as dynamic random-access memory, static random-access memory, etc., non-volatile memory such as hard-drive storage, solid-state storage, flash memory, etc., removable memory, and/or other types of memory circuitry.

More specifically, storage devices 106 may include one or more non-transitory (tangible) computer-readable storage media that store the operating system software and/or any other software code, sometimes referred to as program instructions, software, data, instructions, or code. Compute devices 104 may run (e.g., execute) an operating system and/or other software/firmware that is stored on storage devices 106 to perform the desired operations of server 100 (e.g., the operations as described herein). In such a manner, server equipment 102 may implement one or more services, one or more applications (e.g., each containing one or more services), one or more software servers, and/or other software features to collectively perform the functions of network access control and/or network management for server 100. As described herein, server 100 refers to the underlying server (hardware) equipment and/or the server software (e.g., services and/or applications) executed thereon to perform the operations of server 100.

As just a few illustrative examples, server 100 may be configured to provide network policy reception, definition, and enforcement (e.g., reception, definition, and enforcement of segmentation policy and/or security policy via virtual local area networks (VLANs), access control lists (ACLs), vendor-specific attributes (VSAs), and/or other policy-defining features), natural language query, processing, and response (e.g., a chat interface for outputting network information and network configuration assistance and recommendation based on user natural language input), network-connected device profiling (e.g., the gathering, storage, and analysis of network-connected device information to facilitate network policy recommendations and/or other network configuration recommendations), predictive failure event handling (e.g., prediction and handling of future expected (yet-to-occur) failure events associated with server infrastructure and/or network configuration), network authentication (e.g., authentication for user and/or user device(s) connected to the network), public key infrastructure (PKI) (e.g., includes a certificate authority, a certificate issuance service, a certification validation and/or status lookup service, a certificate database, etc.), interfacing and integration services with external applications and/or servers (e.g., to obtain network and/or user information from external equipment and distribute network and/or user information to external equipment), and device and/or user onboarding (e.g., registration and storage of user and/or user device information).

In general, server 100 may perform any suitable functions for network access control and network management. Configurations in which server 100 facilitates network configuration and network policy configuration (e.g., reception, definition, and enforcement of network policies) are sometimes described herein as an illustrative example.

In the example of FIG. 1, server 100 may be implemented as a part of a network such as cloud network 108 (e.g., a datacenter network). Cloud network 108 may include one or more network devices such as switches (e.g., multi-layer switches), routers, gateways, bridges, hubs, repeaters, firewalls, wireless access points, devices serving other networking functions, devices that include a combination of these functions, or other types of network devices. Multiple such network devices (e.g., of different types or having different functions) may be present in cloud network 108 and interconnected therebetween and with other network devices to form a cloud network that forwards traffic to and from different portions of server 100 (e.g., different compute and/or storage devices of server equipment 102) serving as end hosts of cloud network 108.

Configurations in which server 100 is implemented on public cloud infrastructure (e.g., cloud network 108 is a public cloud network) are sometimes described herein as an illustrative example. If desired, server 100 may be implemented on a private cloud network or an on-premise network (e.g., an on-premise datacenter network).

Server 100 may communicate with (client) devices 110 of network 120 such as network devices 112 and host devices 114 (e.g., Internet-of-Things (IoT) devices 116 such as network-connected appliances or devices such as cameras, thermostats, wireless sensors, medical or health sensors which are sometimes referred to as Internet-of-Medical-Things (IOMT) devices, or other sensors, lighting fixtures, speakers, printers, or other output devices, controllers or other input devices, and other network-connected equipment that serve as input-output devices and/or computing devices in a distributed networking system). Devices 110 of network 120 may also include one or more network administrator devices 118 (e.g., a computing device operated by a network administrator or a user with network administrator privileges to perform configuration and administration of network devices 112). If desired, a device 118 may serve as an end host of network 120 or may simply connect to network device(s) 112 for device administration without necessarily being an end host of network 120.

In some arrangements described herein as an illustrative example, communication between server 100 and at least some (end) host devices 114 may occur via network devices 112 and links 113 (e.g., network devices 112 may forward network traffic between server 100 and host devices 114 to facilitate communication therebetween). Devices 110 may form part of network 120 for which server 100 provides the above-mentioned functions (e.g., network policy definition and application, interfacing and integration services with external supplemental applications and/or servers, device and/or user onboarding, network-connected device profiling, network authentication, etc.).

Host devices 114 may serve as end hosts of network 120 connected to each other and/or connected to other end hosts of other networks (e.g., server 100 of cloud network 108) via network devices 112 using communication paths 113. Administrator devices 118 may perform network configuration and network policy configuration for network 120 using server 100 (e.g., via communication paths 113, 122, etc.). Other types of user devices may serve as end host devices 114. Network devices 112 may include switches (e.g., multi-layer switches), routers, gateways, bridges, hubs, repeaters, firewalls, wireless access points, devices serving other networking functions, devices that include a combination of these functions, or other types of network devices.

Server 100 may provide network access control and network management services for network 120 by communicating with devices 110 via communication paths 122. To facilitate network access control and network management, server 100 may communicate with other supplemental equipment 124 (e.g., other servers implemented on server equipment similarly containing compute(s) and/or storage device(s)). Supplemental equipment 124 may sometimes be referred to as external equipment 124 when implemented on equipment external to server equipment 102 on which server 100 is implemented. Configurations in which server 100 communicates with one or more systems or platforms that provide additional contextual information (e.g., network entity attribute information) for network 120, the users of network 120, and/or devices 110 on network 120 such as an identity provider system or platform 132 are sometimes described herein as an illustrative example. System 132 may be implemented using one or more servers to execute one or more services that provide user identity authentication, supply user contextual information such as user role or identity information, and/or supply other types of user and user device information (e.g., services provided as part of a single sign-on (SSO) provider platform).

If desired, supplemental equipment 124 may include network management and network device management system(s) such as a wireless access point provisioning and management system (e.g., on wireless access point provisioning and management equipment 126 such as a wireless access point management server), a network switch provisioning and management system (e.g., on network switch provisioning and management equipment 128 such as a network switch management server), and/or other network device provisioning and management equipment that communicate with devices 110 (e.g., to supply provisioning and/or configuration data to devices 110, to receive network performance metrics data from devices 110, and/or to exchange other suitable information with devices 110), may include network analysis system(s) such as network analysis platform 130 based on servers and/or services that provide analysis of network performance by way of providing end-point visibility and security analysis (e.g., based on network traffic to and/or from host devices 114), and/or may include other systems or platforms that interact with server 100 and/or devices 110.

Supplemental equipment 124 may communicate with components of network 120 (e.g., network devices 112, host devices 114, and/or other devices of network 120) to supply provisioning, configuration, and/or control data, to receive network, device, and/or user information, and/or to otherwise exchange information therebetween via communications paths 134. Supplemental equipment 124 may communicate with server 100 (e.g., different portions of server equipment 102) to transmit the received network, device, and/or user information, to receive network access control and/or management information (e.g., network policy information), and/or to otherwise exchange information therebetween via communications paths 136.

Configurations in which equipment 124 are provided as part of a cloud-based platform (e.g., includes services and/or applications executing on server equipment of the same type(s) as described in connection with server equipment 102) are sometimes described herein as illustrative examples. In these examples, equipment 124 may be implemented within the same cloud network as or different cloud networks than server 100. If desired, one or more systems of supplemental equipment 124 may be implemented locally (e.g., local to network 120) instead of as a cloud application (e.g., implemented on cloud-based server equipment) or may be implemented in other desired manners.

The networking system in FIG. 1 (e.g., the combination of cloud network 108, network 120, and equipment 124) may span any suitable scope (e.g., may span an overall network of any suitable scope) depending on the implementations of server 100, devices 110, and/or supplemental equipment 124. Communication paths 122, 134, and 136 may be implemented according to the scope of the networking system. Configurations in which one or more (e.g., all) of communication paths 122, 134, and 136 include the Internet are sometimes described herein as an illustrative example. In particular, any of communications paths 122, 134, and 136 may implement communication (e.g., exchanges messages in the form of frames, packets, etc.) based on a secure Hypertext Transfer Protocol (e.g., Hypertext Transfer Protocol Secure (HTTPS)), a Remote Authentication Dial-In User Service (RADIUS) protocol (e.g., a RADIUS protocol with Transport Layer Security (TLS) encryption sometimes referred to as a RadSec protocol or another type of secure RADIUS protocol), and/or other secure protocols for establishing and communicating using the corresponding communications paths, as just a few examples.

Figure 2:
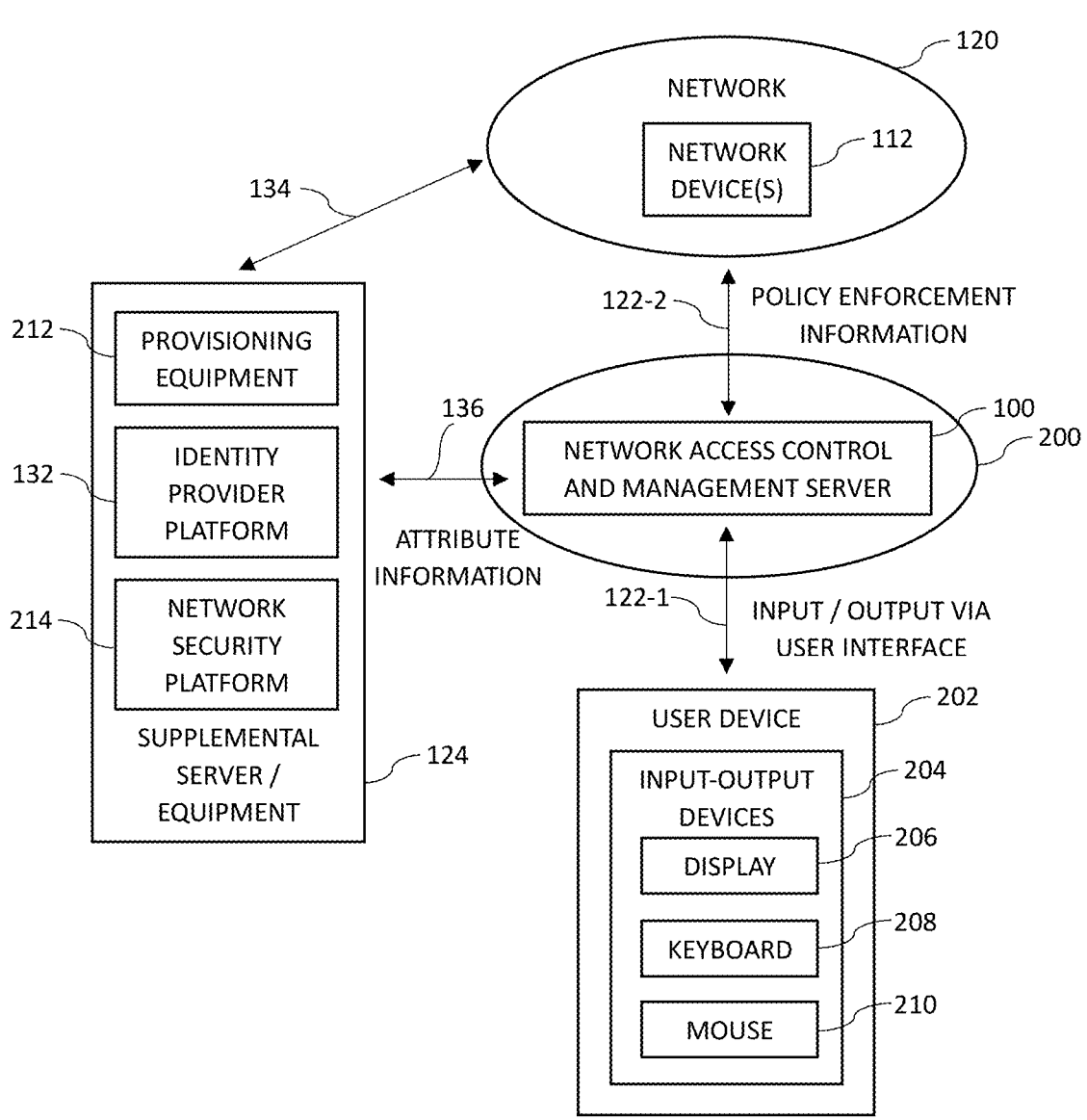
FIG. 2 is a diagram of an illustrative network management server configured to manage networks and corresponding network policies in accordance with some embodiments.

FIG. 2 is a diagram of an illustrative network management server 100 configured to obtain network policy information based on user input and to apply (e.g., enforce) the network policy based on the received network policy information. In the example of FIG. 2, network management server 100 may be implemented as part of a datacenter or cloud network 200 (e.g., cloud network 108 in FIG. 1).

A client device such as user device 202 (e.g., host device 114, administrator device 118, or other types of client devices of network 120 in FIG. 1) may be configured to communicate with server 100 via a user interface (e.g., via communication path 122-1 such as an instance of path 122 in FIG. 1). As examples, user device 202 may be a computing device such as a desktop, a portable computing device (e.g., a laptop, a cellular telephone, etc.), or any other suitable computing device configured to receive user input and supply the received user input to server 100.

The computing functions of the computing device may be provided by processing circuitry (e.g., one or more of central processing units (CPUs), graphics processing units (GPUs), microprocessors, general-purpose processors, host processors, microcontrollers, digital signal processors, programmable logic devices, and/or other types of processor circuitry) and memory circuitry (e.g., one or more of non-volatile memory, volatile memory, removable memory, and/or other types of storage circuitry) of user device 202. In particular, the memory circuitry may include non-transitory (tangible) computer readable storage media that stores the operating system software and/or any other software code, which when executed by the processing circuitry, performs desired operations of user device 202 such as providing a user input-output interface (e.g., running a web browser application on which a graphical user interface is provided).

In one illustrative arrangement for supporting the user interface, user device 202 may include input-output devices 204 such as display 206, keyboard 208, mouse 210, as just a few examples. Display 206 may supply a user with output for a user interface (e.g., display a web browser application with a graphical user interface) and the user may interact with the user interface using keyboard 208 and mouse 210 (e.g., supply input for the web browser application via the graphical user interface).

Configurations in which the user input includes desired network policy information such as information defining a network segmentation policy are sometimes described in connection with FIGS. 2-10 as an illustrative example. Based on the user input conveying the network policy information, server 100 may apply the corresponding network policy to network 120 (e.g., by sending corresponding policy enforcement information to components of network 120). As an example, the sent policy information may be in the form of configuration data conveyed to network devices 112 and/or may be in the form of user identity and authentication data conveyed to network devices 112 (e.g., via communication path 122-2 such as an instance of path 122 in FIG. 1). In one illustrative arrangement, some of all of the network devices 112 may be controlled and configured by network device provisioning (and/or management) equipment 212 (e.g., one or more network device management servers such as access point provisioning equipment 126 and network switch provisioning equipment 128 in FIG. 1). Accordingly, server 100 may communicate with these supplemental servers 124 (e.g., provisioning server equipment 212) to supply the policy enforcement information to network devices 112 (e.g., using communication paths 136 and 134) and/or may apply the network policy by generally supplying equipment 124 with information based on the defined network policy.

The workflow of supplying network policy information is typically tedious and prone to error as the user needs to supply numerous inputs in an unstructured manner. In particular, numerous different network policy objects may need to be created and paired in an appropriate manner such that the administrator-intended network policies can be defined. This process requires expertise on the part of the administrator and still can be tedious and error-prone with even administrator expertise. Accordingly, it may be desirable to provide a mechanism by which network policies can be configured in an administrator-intent-based manner (e.g., user input containing intent-based policy definitions are translated into corresponding network policies for definition and application). In particular, server 100 may provide a user interface (e.g., through a web server) to user device 202 to simplify and organize the input of the network policy information and simplify the user input of policy information.

The user interface may provide a structured template or form through which the selectable options for defining network policies are presented as user output and based on which user-selected options are used to define network policy. In particular, the selectable options may contain pre-populated network entity attributes obtained from supplemental equipment 124 (e.g., via communication paths 136) and maintained at server 100. The use of known (e.g., maintained) network entity attribute information may guarantee their existence and the consistency of their information, while providing the user with the option to select the desired attribute for network policy definition.

Figure 3A:
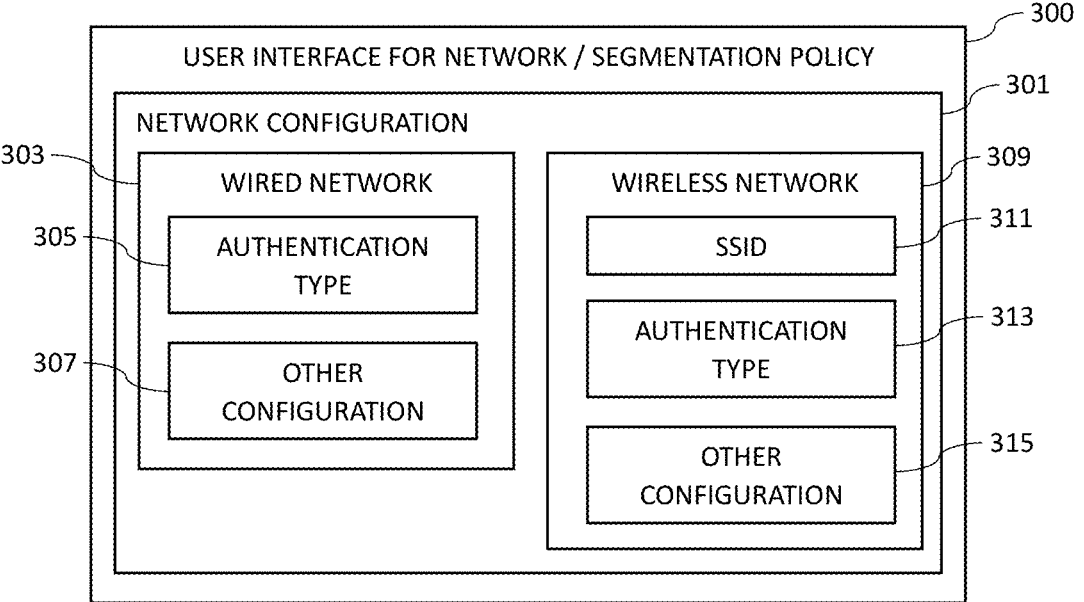
FIGS. 3A and 3B are diagrams of an illustrative user interface for receiving network configuration and policy configuration information in accordance with some embodiments.

FIG. 3A is a diagram of an illustrative user interface 300 supplied by server 100 (e.g., implementing a web server) for display at user device 202 to prompt user input for defining a network configuration 301 (e.g., as part of network policy information), which is then conveyed to server 100.

In particular, user interface 300 (e.g., displayed using display 206 in FIG. 2) may prompt a user (e.g., a network administrator) to enter network configuration information in the form of selectable options for defining network configuration 301. As an example, user interface 300 may present an option to configure (e.g., define) a wired network (configuration) 303 (e.g., a wired network in network 120). As part of the option to configure wired network 303, user interface 300 may further present selectable options 305 for inputting an authentication type (e.g., display an option for Extensible Authentication Protocol-Transport Layer Security (EAP-TLS), an option for Media Access Control (MAC) authentication, etc.) for wired network 303 and/or may provide additional selectable options 307 for inputting other configurations for defining wired network 303 (e.g., an enable or disable option to fall back to other methods of authentication such as MAC authentication).

As another example, user interface 300 may present an option to configure (e.g., define) a wireless network (configuration) 309 (e.g., one or more wireless networks in network 120). As part of the option to configure wireless network 309, user interface 300 may further prompt user input of a wireless network identifier such as a service set identifier (SSID) 311 for wireless network 309. As part of the option to configure wireless network 309, user interface 300 may further present selectable options 313 for inputting an authentication type (e.g., display an option for Extensible Authentication Protocol-Transport Layer Security (EAP-TLS), an option for unique pre-shared key authentication, etc.) for wireless network 309 and/or may provide additional selectable options 315 for inputting other configurations for defining wireless network 309.

In illustrative configurations described herein, selectable options may be provided using dropdown options, checkboxes (e.g., checked and unchecked options), radio buttons, etc., in user interface 300. As desired, user interface 300 may also include textboxes. The use of a specific form with these options may serve to present the user with a structured and intent-based format based on which a network configuration can be defined (and subsequently used to define a network policy for the network). Server 100 may receive user selections (e.g., user selected options) and translate the user selections to corresponding network attributes such as standards-compliant attributes based on which the network is specified by server 100. In such a manner, the more complex network attributes may be hidden from the user and the user interacts with the more easily understandable intent-based user interface 300.

Figure 3B:
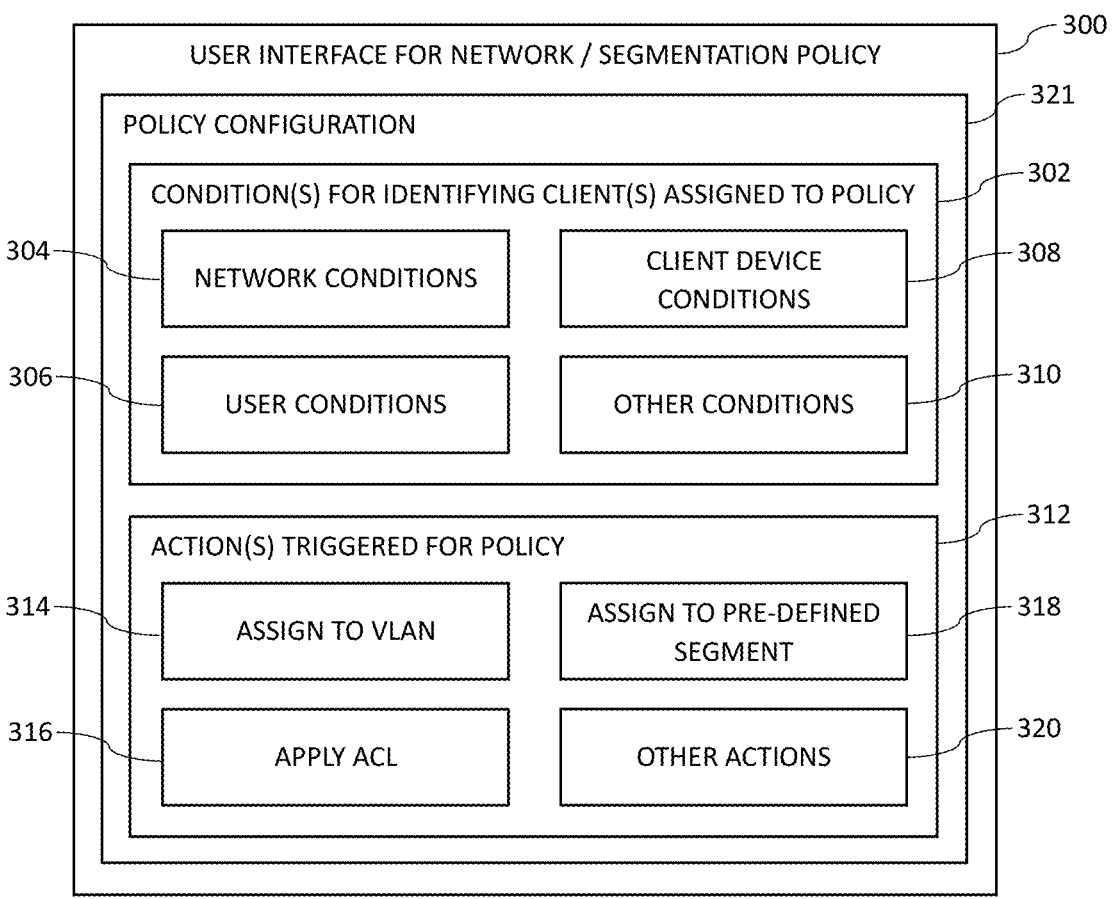

FIG. 3B is a diagram of an illustrative user interface 300 supplied by server 100 (e.g., implementing a web server) for display at user device 202 to prompt user input for defining network policy information, which is then conveyed to server 100. The illustrative user interface 300 in FIGS. 3A and 3B may be provided on the same or different web pages but may generally be provided on an integrated web platform provided by server 100.

In particular, user interface 300 (e.g., displayed using display 206) may prompt a user (e.g., a network administrator) to enter network policy configuration information 321 such as network segmentation policy information in the form of one or more conditions 302 that identify clients devices (e.g., client devices 110 in FIG. 1) to be assigned to a policy (e.g., a particular segment of a segmentation policy) and one or more actions 312 to be triggered or performed as part of the policy (e.g., as part of the segment assignment or application).

Configurations in which conditions 302 and actions 312 are for defining segmentation policies (e.g., VLAN-based policies, ACL-based policies, etc.) are described herein as an illustrative example. If desired, other types of policies (e.g., network security policies such as firewall policies) may be defined by conditions 302 and actions 312.

In the example of FIG. 3B, user interface 300 may provide options to enter any combinations of conditions 302 based on the desired intent of the policy (e.g., the intended matching criteria of the segment in the segmentation policy). As examples, conditions 302 may include network conditions 304 based on network-level attributes or characteristics (e.g., specifying a set of hosts or clients sharing a same network-level attribute such as being part of a same wired network of network 120, being connected to a first wireless network of network 120 having a first service set identifier (SSID) or connected to a second wireless network of network 120 having a second SSID, a set of hosts or clients connected to one or more wired or wireless networks implemented with a same authentication type, etc.), user conditions 306 based on user-level attributes or characteristics (e.g., specifying a set of hosts or clients of one or more users having a same user-level attribute such as being in a same company department, being of a same employment status, being in a same user geographical area or office, having a same method of user authentication type, etc.), client device conditions 308 based on device-level attributes or characteristics (e.g., specifying a set of hosts or clients of a given device group having a same attribute such as being of a same functional type of device, having a same application or version of applications running on the devices, etc.), and other conditions 310 based on other customizable shared attributes characteristics of hosts or clients (e.g., based on a same protocol-specific attribute, based on a same security or encryption attribute, based on a same vendor-specific attribute, based on one or more same tags, etc.).

By using one or a combination of conditions 302 specified using the various desired attributes (e.g., at the network-level, at the user-level, at the device-level, and/or at other levels), a set of host or client devices may be identified for a particular network policy (e.g., a network segmentation policy). In other words, the network policy may be defined to apply to the set of device meeting conditions 302.

User interface 300 may provide options to enter any combinations of actions 312 associated with the network policy (e.g., applicable when a device applied with the segmentation policy). As examples, actions for the identified set of devices (e.g., identified based on condition(s) 302) may include action 314 to assign the devices to a particular VLAN, may include action 316 to apply an ACL to the devices, may include action 318 to assign the devices to a pre-defined segment or a pre-existing segment such as a macro-segment based on device type, and/or may include other (customizable) actions 320 triggered as part of the application of the network policy (e.g., as part of device segment assignment that produces and/or assigns customized tags to corresponding devices in the segment).

Figure 4A:
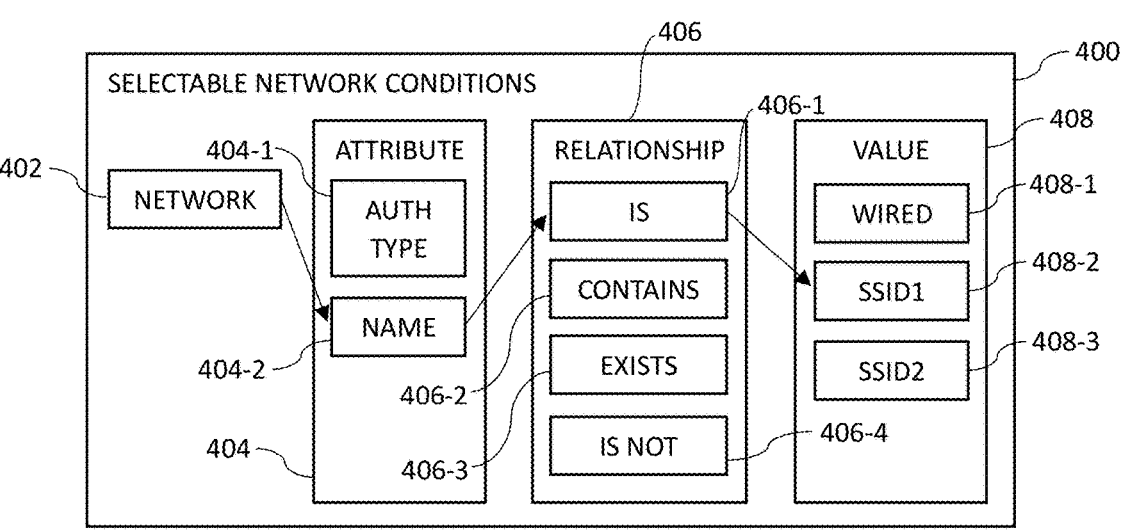
FIGS. 4A and 4B are diagrams of illustrative conditions for a network policy configuration selectable using a user interface in accordance with some embodiments.
Figure 4B:
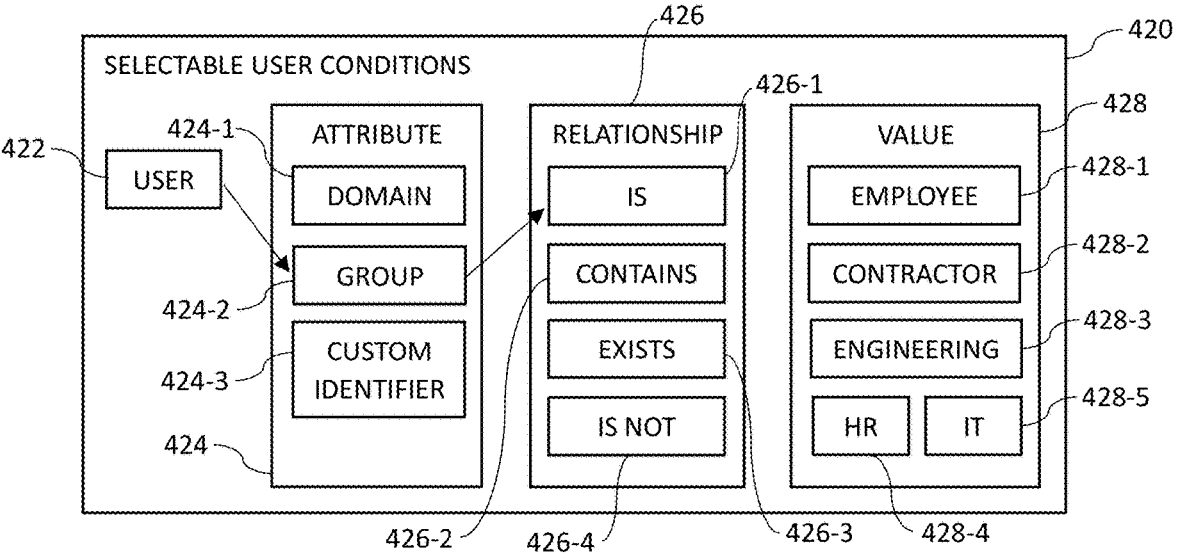

FIGS. 4A and 4B show illustrative selectable options provided by server 100 for inputting illustrative network-level conditions 400 and user-level conditions 420 (e.g., conditions 302 in FIG. 3). In the example of FIG. 4A, the user interface (e.g., user interface 300) may provide (e.g., display at device 202) various options to define a desired network-level condition 304. The user interface may present a network-level option 402 to define a network-level condition for a network policy (e.g., for a network segmentation policy, for a network security policy, etc.). Based on the selection of network-level option 402 by the user via the user interface, the user interface may present selectable network-level attribute options 404, based on which the network-level condition 400 can be set. As examples, network-level attribute options 404 may include a network authentication type option 404-1 (e.g., corresponding to authentication type 305 and 313 in FIG. 3A for configured networks) and a network name option 404-2 (e.g., corresponding a network identifier such as a wired network name, wireless network SSIDs, etc.).

Based on the selection of a desired network-level attribute option (e.g., network name option 404-2 in the example of FIG. 4A) by the user using the user interface, the user interface may present relationship options 406 that define the device relationship to the attribute value selected by attribute value options 408. As examples, relationship options 406 may include an exact match option (e.g., "IS" option 406-1), a partial match option (e.g., "CONTAINS" option 406-1), an existence option (e.g., "EXISTS" option 406-3), and/or other inclusion-based relationship options. As additional examples, relationship options 406 may also include exclusionary options such as a non-exact-match option (e.g., "IS NOT" option 406-4), a no partial match option, and a nonexistence option.

Network-level attribute value options 408 may include existing network name attribute values (e.g., discovered and/or received by, configured and/or stored at, or generally known to server 100 which is configured to provide options 408). In some illustrative configurations described herein, the attribute values may be obtained from supplemental equipment 124 (FIGS. 1 and 2). As examples, network-level attribute value options 408 for the network name attribute may include a wired network name (option) 408-1, a first wireless network SSID (option) 408-2, and a second wireless network SSID (option) 408-3. The example of one wired network name and two wireless network SSID options for a network name attribute is merely illustrative. In general, any desired number of value options and/or other types of value options may be provided for each network-name attribute and/or for each other network-level attribute.

As one illustrative example described in connection with FIG. 4A, the user interface (e.g., user interface 300) may receive options 402, 404-2, 406-1, and 408-2 as selections or input by a user to define a network-level condition that specifies a group of client devices belonging to (e.g., connected to) the wireless network having the first SSID (e.g., SSID1). This group of host or client devices may be matched and determined (e.g., by server 100) to be part of the corresponding network policy defined by this network-level condition. Corresponding action(s) as described in FIG. 3B may be triggered for these matching client devices.

In the example of FIG. 4B, the user interface (e.g., user interface 300) may provide (e.g., display at device 202) various options to define a desired user-level condition 306. The user interface may present a user-level option 422 to define a desired user-level condition for a network policy (e.g., for a network segmentation policy, for a network security policy, etc.). Based on the selection of user-level option 422 by the user via the user interface, the user interface may present selectable user-level attribute options 424, based on which the user-level condition 420 can be set. As examples, user-level attribute options 424 may include a user domain option 424-1, a user group option 424-2, and a custom user identifier or tag option 424-3.

Based on the selection of a desired user-level attribute option (e.g., option 424-2 in the example of FIG. 4B), the user interface may present relationship options 426 that define the device relationship to the attribute value selected by attribute value options 428. As examples, relationship options 426 may include an exact match option (e.g., "IS" option 426-1), a partial match option (e.g., "CONTAINS"

option 426-1), an existence option (e.g., "EXISTS" option 426-3), and/or other inclusion-based relationship options. As additional examples, relationship options 426 may also include exclusionary options such as a non-exact-match option (e.g., "IS NOT" option 426-4), a no partial match option, and a nonexistence option.

User-level attribute value options 428 may include existing user group attribute values (e.g., discovered and/or received by, configured and/or stored at, or generally known to server 100 which is configured to provide options 428). In some illustrative configurations described herein, the attribute values may be obtained from supplemental equipment 124 (FIGS. 1 and 2). As examples, user-level attribute value options 428 for the user group attribute may include an employee option 428-1 indicating a user group with users that are employees, a contractor option 428-2 indicating a user group with users that are contractors, an engineering option 428-3 indicating a user group with users that are in the engineering department, a human resources (HR) option 428-4 indicating a user group with users that are in the HR department, and an information technology (IT) option 428-5 indicating a user group with user that are in the IT department. The example of user-group attribute value options 428 (and other options) as shown in FIG. 4B is merely illustrative. In general, any desired number of value options and/or other types of value options may be provided for each user-group attribute and/or for each other user-level attribute.

As one illustrative example described in connection with FIG. 4B, the user interface (e.g., user interface 300) may receive options 422, 424-2, 426-1, and 428-1 as selections or input by a user to define a user-level condition that specifies a group of devices belonging to users that are employees. This group of host or client devices may be matched and determined (e.g., by server 100) to be part of the corresponding network policy defined by this user-level condition. Corresponding action(s) as described in FIG. 3B may be triggered for these matching client devices.

FIGS. 4A and 4B are merely illustrative of some of the selectable options for setting conditions 302 at various levels of granularity for identifying a group of devices for a network policy. Different options than those shown in FIGS. 4A and 4B may be presented as conditions, attribute, relationship, and/or value options as desired.

A combination of conditions such as the selected network-level condition of FIG. 4A and the selected user-level condition of FIG. 4B may be used to define a group of devices that are an intersection of the group of devices defined by each separate condition (e.g., a group of devices belonging to the wireless network having the first SSID and belonging to users that are employees). The user interface (e.g., user interface 300) may receive as user input, any combination of one or more network-level conditions, one or more user-level conditions, one or more device-level conditions, and one or more other conditions to define the group of devices for each network policy (e.g., each segmentation policy).

Figure 5:
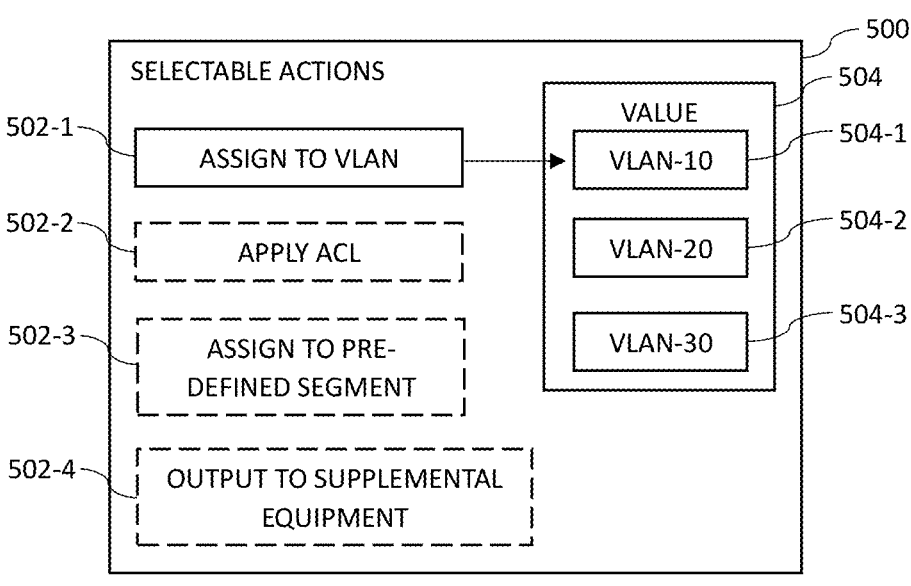
FIG. 5 is a diagram of illustrative actions for a network policy selectable using a user interface in accordance with some embodiments.

Along with providing a user with options to define network devices (e.g., for a network policy) using conditions 302, the user interface provided by server 100 may also supply a user with options to define corresponding network policy actions 312 associated with (e.g., triggered by the assignment of the host or client devices to the network policy). FIG. 5 shows illustrative selectable options for output via the user interface provided by server 100. In particular, the selectable options may be used for inputting (e.g., selecting) illustrative actions 500 (e.g., one or more actions 312 in FIG. 3B).

In the example of FIG. 5, the user interface (e.g., user interface 300) may provide (e.g., display at device 202) various options to define a desired action 312 (e.g., selected from selectable actions 500). The user interface may present an action option 502-1 to assign devices identified using conditions as described in FIGS. 3 and 4 to a particular VLAN, an action option 502-2 to apply a particular ACL to devices identified using conditions as described in FIGS. 3 and 4, an action option 502-3 to assign devices identified using conditions as described in FIGS. 3 and 4 to a pre-defined segment (e.g., a macro-segment or segment based on a common device characteristic, behavior, and/or classification), and/or other illustrative action options (e.g., an action option 504-3 to provide output to a supplemental server, platform, or equipment 124). Based on the selection of the type of action (e.g., action options 502-1, 502-2, 502-3, and/or 502-4), the user interface may present corresponding value options based on the corresponding selected action type (e.g., values identifying VLANs for option 502-1, values identifying ACLs for option 502-2, values identifying pre-defined segments for option 502-3, values identifying the specific supplemental equipment and/or the information for output, etc.). As an example, VLAN value options 504 may include a first VLAN VLAN-10 as value option 504-1, a second VLAN VLAN-20 as value option 504-2, and a third VLAN VLAN-30 as value option 504-3.

One or more actions may be selected and therefore performed for each network policy configuration (e.g., devices of a segment may be assigned to a VLAN such as VLAN-10 in the example of FIG. 5 and/or corresponding VLAN information may be output to a supplemental server or platform).

Figure 6:
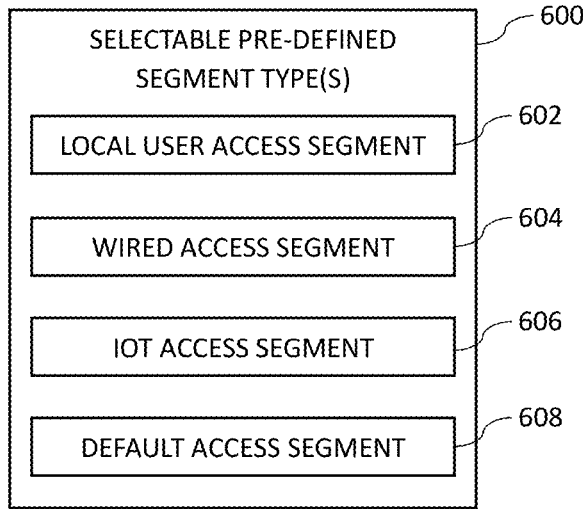
FIG. 6 is a diagram of illustrative network segment types configurable by a network administrator and selectable using a user interface in accordance with some embodiments.

In some instances, default and/or automatically generated network policies may be used. As one example, FIG. 6 shows illustrative segment types 600 for corresponding network segmentation policies that may be pre-configured or pre-defined by a network administrator, or automatically generated by server 100. These segmentation types or generally default network policies may be provided at the user interface (e.g., on user interface 300 for display at user device 202) to prompt user input in simplifying network policy definition. As examples, the user interface (e.g., user interface 300) may provide options 602, 604, 606, and 608 to define a local user access segment, a wired access segment, an IoT access segment, and a default access segment, respectively. These options may serve as templates that each have a set of pre-defined conditions 302 and/or a set of predefined action(s) 312 based on the type of intended segment (or generally intended network policy). Additional conditions and/or actions may further be added and default conditions and/or actions may be removed to complete the desired segment definition based on these default network policy definitions.

The various types and/or numbers of selectable options described in connection with FIGS. 4-6 are merely illustrative. Any suitable set (e.g., number, type, etc.) of options may be output to a user for selection in providing a suitable set of network policies defined by conditions and/or actions.

Figure 7:
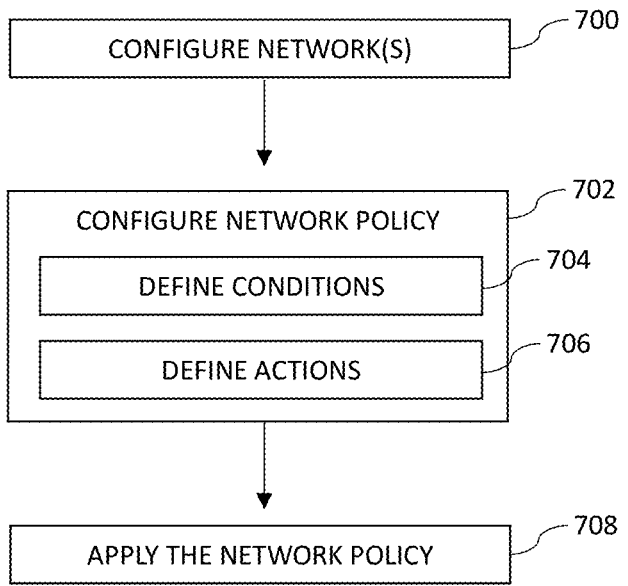
FIG. 7 is a flowchart of illustrative operations for managing networks and corresponding network policies in accordance with some embodiments.

FIG. 7 is a flowchart of illustrative operations for configuring (e.g., defining, applying, enforcing, etc.) a network policy (e.g., a network segmentation policy).

These operations may be performed by one or more processors of these different elements of a networking system (e.g., the system of FIGS. 1 and/or 2). As examples, these operations may be performed with the processing circuitry of server 100 (e.g., implemented using compute devices 104) and/or processing circuitry of user device 202. The illustrative operations described in connection with FIG. 7 may generally be performed by the corresponding processing circuitry of the device or system (e.g., compute devices 104 and/or corresponding processing circuitry of device 202) by executing software instructions stored on the corresponding memory circuitry of the device or system (e.g., storage devices 106 or corresponding storage circuitry of device 202). If desired, one or more operations described in connection with FIG. 7 may be performed by other dedicated hardware components in server 100, device 202, and/or other components in the networking system.

In one illustrative configuration described herein as an example, the operations described in connection with FIG. 7 may be performed using the system described in connection with FIG. 2. In particular, a server (e.g., server 100) may communicate with a client device (e.g., user device 202) to present a user interface (e.g., a graphical user interface at display 206) through which user output is presented and user input is received.

At block 700, server 100 may present, via the user interface, one or more options (e.g., options as described in connection with FIG. 3A) to the user to define features of one or more network portions of a network (e.g., network 120) such as one or more wired network portions, one or more wireless network portions (e.g., having corresponding SSIDs). If desired, server 100 may also present, via the user interface, one or more options to the user to define one or more other network identity such as one or more network devices, one or more characteristics (e.g., attributes) of the network devices, one or more users, one or more characteristics (e.g., attributes) of the user, etc. If desired, some of these characteristics (e.g., attributes) may be obtained by server 100 in other manners such as through one or more supplemental servers 124 that gather device and/or user information and supply the corresponding information to server 100. In such a manner, the user input and/or input from other sources may help server 100 discover various network entities in the network and corresponding attributes of the network entities and their attribute values.

Server 100 may receive, via the user interface, user input (e.g., selections of selectable options, text input, etc.) that defines the features of wired and/or wireless networks, the network entities therein, the network entity attributes, etc.

At block 702, server 100 may present, via the user interface, one or more options (e.g., options as described in connection with FIG. 3A) the user to define a network policy (e.g., a network segment) within the network (e.g., network 120). For each network policy (e.g., each network segment), the user interface may present options to the user to define conditions for the network policy (at block 704) and options to define actions for the network policy (at block 706). As an illustrative example, server 100 may present, via the user interface, user input (e.g., user selections) of conditions and actions for the network policies using the selectable options as described in connection with FIGS. 3-6. In particular, the network entities, their attributes, and their attribute values configured at or otherwise obtained at block 700 may be used to provide the corresponding selectable options (e.g., options 404, 408, 424, 428, 502, and 504) presented to the user. Server 100 may receive the user input (e.g., user-input options indicative of conditions and actions for network policies) from user device 202.

At block 708, server 100 may apply (e.g., enforce) the network policy (e.g., the segmentation policy containing the network segments that the user defined at block 702). As examples, server 100 may send the network policy information (e.g., the devices identified by the conditions, the appropriate actions to be taken for the devices, and/or other information usable to identify the devices and take the actions) to network devices or other equipment that enforce the segmentation policy (e.g., supplemental equipment 124), may store the policy information (e.g., associate the devices identified by the conditions to corresponding ACLs tables, VLAN tables, segmentation tables, etc.), may take any other appropriate actions (e.g., other actions 502 in FIG. 5) to ensure that the network operations based on the user-defined network policies are performed.

As described in connection with blocks 700 and 702, server 100 may obtain network entity information (e.g., attributes and corresponding attribute values of different network entities) based on user configuration and/or based on receiving the network entity information from supplemental equipment 124. Accordingly, server 100 may maintain a database of network entity attributes based on which selectable options described in connection with FIGS. 4-6 are presented.

Figure 8:
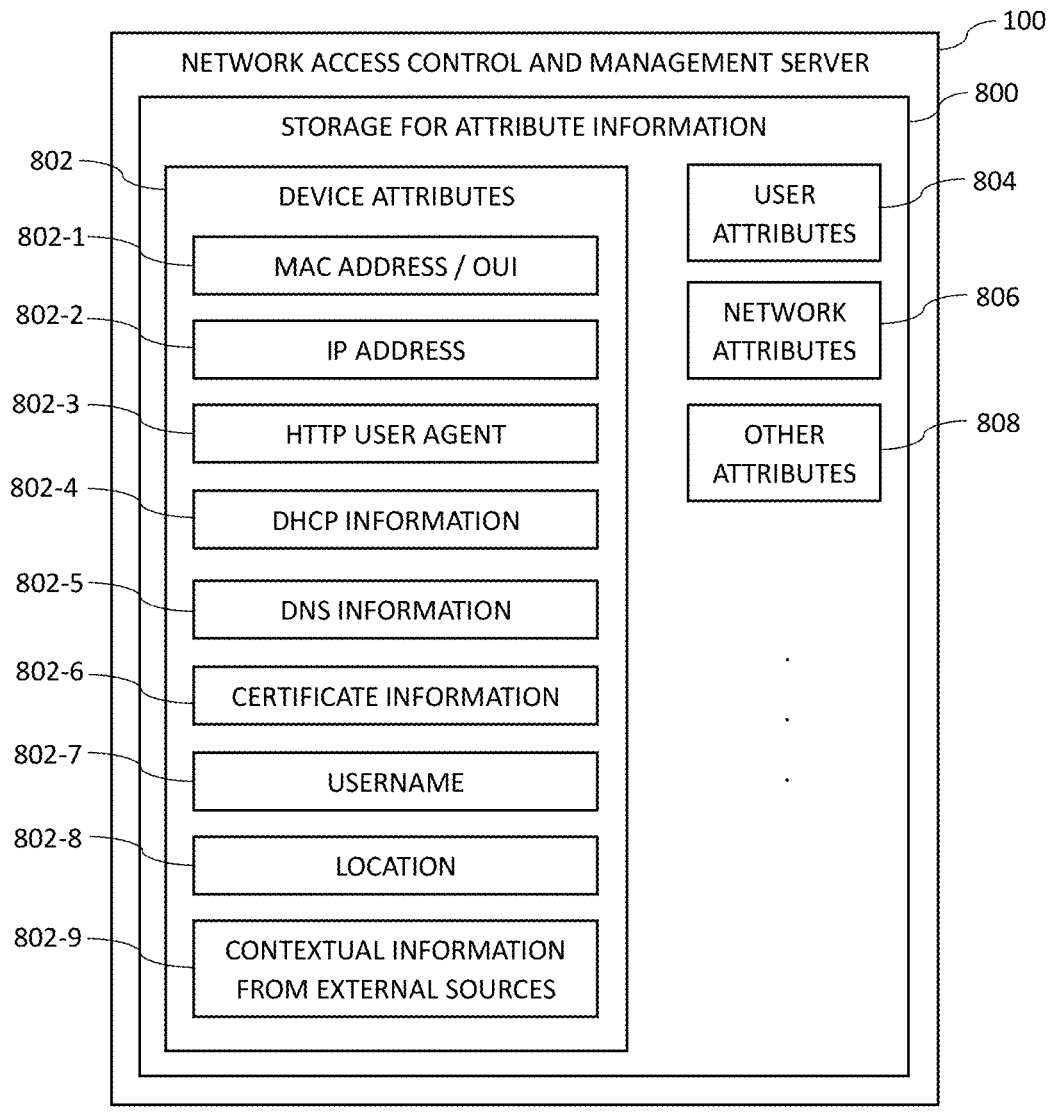
FIG. 8 is a diagram of an illustrative database containing network entity attribute information for use in defining network policies in accordance with some embodiments.

FIG. 8 is a diagram of illustrative network management server 100 configured to store network entity attribute information at storage 800 (e.g., implemented using one or more storage devices 106 in FIG. 1). As shown in the example of FIG. 8, storage 800 may maintain, in a database, device or device-level attributes 802 (and the corresponding attribute values for the devices), may maintain user or user-level attributes 804 (and the corresponding attribute values for the users), may maintain network or network-level attributes 806 (and corresponding attribute values for the wired and/or wireless networks), may maintain other types of attributes 808 (and corresponding attribute values), etc.

If desired, the attribute information may be obtained by server 100 from attribute sources in communication with server 100 (e.g., supplemental equipment 124), from user configuration received at server 100, from the host devices of the network (e.g., host devices 114 of network 120), from the network devices of the network (e.g., network devices 112), and/or from other components of network 120.

As an illustrative set of examples, device attributes 802 may include attribute information 802-1 containing or indicative of a Media Access Control (MAC) address and/or organizationally unique identifier (OUI) of the device, attribute information 802-2 containing or indicative of an Internet Protocol (IP) address of the device, attribute information 802-3 containing or indicative of a HTTP (e.g., HTTPS) user agent, Dynamic Host Configuration Protocol (DHCP) attribute information 802-4 containing received DHCP parameters and/or DHCP parameters for transmission, Domain Name System (DNS) attribute information 802-5, certificate attribute information 802-6 (e.g., PKI certificate information, and/or other security or encryption information), attribute information 802-7 containing or indicative of a user-name (for a user of the device), attribute information 802-8 containing or indicative of a location (of the device), and other contextual attribute information 802-9 of the device from external sources, as just a few examples. User attributes 804 may include user role information, may include user location information, etc. Network attributes 806 may include network authentication method, network identifier, etc.

In the example of FIG. 8, device attributes may be maintained for each device of network 120 (e.g., IoT devices 116 and other types of end hosts such as portable or mobile devices, desktops, etc.). Server 100 may also maintain (e.g., store) network device information and/or information of other devices associated with network 120.

FIG. 9 is a flowchart of illustrative operations for configuring a new network (e.g., for which network policies such as network segmentation policies can be applied). In particular, the operations described in connection with FIG. 9 may be performed as part of block 700 in FIG. 7.

These operations may be performed by one or more processors of these different elements of a networking system (e.g., the system of FIGS. 1 and/or 2). As examples, these operations may be performed with the processing circuitry of server 100 (e.g., implemented using compute devices 104) and/or processing circuitry of user device 202. The illustrative operations described in connection with FIG. 9 may generally be performed by the corresponding processing circuitry of the device or system (e.g., compute devices 104 and/or corresponding processing circuitry of device 202) by executing software instructions stored on the corresponding memory circuitry of the device or system (e.g., storage devices 106 or corresponding storage circuitry of device 202). If desired, one or more operations described in connection with FIG. 9 may be performed by other dedicated hardware components in server 100, device 202, and/or other components in the networking system.

In one illustrative configuration described herein as an example, the operations described in connection with FIG. 9 may be performed using the system described in connection with FIG. 2. In particular, a server (e.g., server 100) may communicate with a client device (e.g., user device 202) to present a user interface (e.g., a graphical user interface at display 206) through which user output is presented and user input is received.

At block 900, server 100 may receive user input via the user interface to configure a new network. The new network to be configured (e.g., defined) may be a wired network (portion) of network 120 or a wireless network (portion) of network 120. Configuring the new network may further facilitate the subsequent configuration of network policies (e.g., segments) on the network. In illustrative configurations described herein the operation of block 900 may include the operations of blocks 902 and 904.

To simplify the network configuration process, at block 902, server 100 may provide (e.g., present), via the user interface, selectable or other options for configuring the new network. These options may include an option to configure a wired network and corresponding additional configuration options for the wired network and may include an option to configure a wireless network and corresponding additional configuration options for the wired network. Illustrative options for configuring the wired or wireless network are described in connection with FIG. 3A.

At block 904, server 100 may obtain (e.g., receive), via the user interface, user input for configuring the new network in the form of selected options or other user input.

At block 906, server 100 may identify multiple network attributes (e.g., standards-compliant attributes such as RADIUS protocol attributes) based on the selected options. In particular, based on receiving user selection of an option to configure a wired network, server 100 may identify a service type attribute value associated with the wired network, a network access server (NAS) port type attribute value associated with the wired network, a NAS identifier attribute value associated with wired network, and/or other attribute values associated with the wired network (e.g., other RADIUS protocol attribute values with the wired network). Similarly, based on receiving user selection of an option to configure a wireless network, server 100 may identify multiple other server type attribute values associated with the wireless network (e.g., other RADIUS attribute values with the wireless network). Further selected options (e.g., an option for a particular authentication type) for configuring the selected wired or wireless network may similarly be used to identify corresponding network attribute values.

At block 908, server 100 may configure (e.g., define) the new network based on the identified network attribute values.

In such a manner, a user or network administrator is not required to have certain expertise (e.g., expertise with the RADIUS protocol) in order to properly configure the new network. In other words, server 100 may present structure options that are structured and intent-based (e.g., whether a user intends to configure a wired network or a wireless network, what type of authentication is intended to be provided for the network, whether certain settings are intended to be configured for the network, etc.) without requiring standards-compliant and/or protocol-compliant to be entered by the user.

Figure 10:
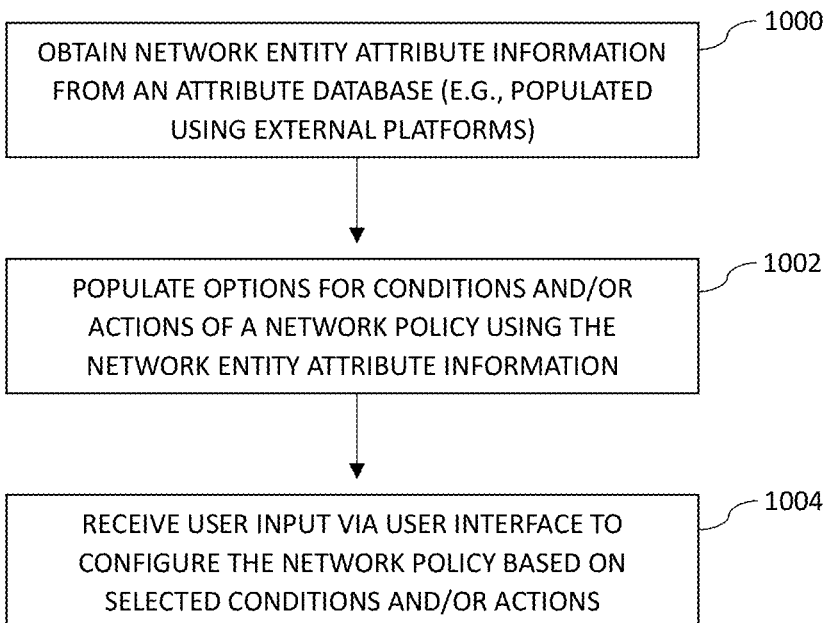
FIG. 10 is a flowchart of illustrative operations for configuring a network policy based on selection of maintained network entity attribute information in accordance with some embodiments.

After configuring a particular network, server 100 may subsequently configure network policies (e.g., segments for segmentation policies) for the network. FIG. 10 is a flowchart of illustrative operations for configuring a network policy (e.g., a network segmentation policy for a corresponding network segment). In particular, the operations described in connection with FIG. 10 may be performed as part of blocks 702 and 708 in FIG. 7.

These operations may be performed by one or more processors of these different elements of a networking system (e.g., the system of FIGS. 1 and/or 2). As examples, these operations may be performed with the processing circuitry of server 100 (e.g., implemented using compute devices 104) and/or processing circuitry of user device 202. The illustrative operations described in connection with FIG. 10 may generally be performed by the corresponding processing circuitry of the device or system (e.g., compute devices 104 and/or corresponding processing circuitry of device 202) by executing software instructions stored on the corresponding memory circuitry of the device or system (e.g., storage devices 106 or corresponding storage circuitry of device 202). If desired, one or more operations described in connection with FIG. 10 may be performed by other dedicated hardware components in server 100, device 202, and/or other components in the networking system.

In one illustrative configuration described herein as an example, the operations described in connection with FIG. 10 may be performed using the system described in connection with FIG. 2. In particular, a server (e.g., server 100) may communicate with a client device (e.g., user device 202) to present a user interface (e.g., a graphical user interface at display 206) through which user output is presented and user input is received.

At block 1000, server 100 may maintain (e.g., obtain and update) network entity attribute information from an attribute database (e.g., the database stored in storage 800 of FIG. 8). In illustrative examples, the attribute information (e.g., types of attributes, specific attribute values for each network entity such as a host or network device, a user, a network, etc.) may be populated using one or more external platforms (e.g., implemented on supplemental equipment 124).

At block 1002, server 100 may populate (user-selectable) options for conditions and/or actions associated with a network policy using the network entity attribute information. In particular, server 100 may present, via the user interface, the populated options as choices for selection in configuring the one or more conditions for the network policy and/or the one or more actions for the network policy.

At block 1004, server 100 may obtain (e.g., receive), via the user interface, user input to configure the network policy based on the conditions and/or actions selected by the options.

By presenting user-selectable options based on maintained network entity attributes to define conditions and/or actions, the user may provide intent-based selections rather than creating multiple objects for network policies that then need to be associated with each other. This helps facilitate the configuration of network policies without the need for the user to have certain knowledge about objects associated with network policies.

The methods and operations described above in connection with FIGS. 1-10 may be performed by the components of one or more network devices, one or more computing devices, and/or one or more servers or other host equipment using software, firmware, and/or hardware (e.g., dedicated circuitry or hardware). Software code for performing these operations may be stored on one or more non-transitory computer-readable storage media (e.g., tangible computer-readable storage media) on one or more of the components of the network device(s), the computing device(s), and/or the server(s) or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s), the computing device(s) and/or the server(s) or other host equipment (e.g., processing circuitry of server 100, processing circuitry of equipment 124, processing circuitry of devices 110, etc.).

The foregoing is merely illustrative and various modifications can be made to the described embodiments. The foregoing embodiments may be implemented individually or in any combination.

What is claimed is:

1. A method for network policy configuration, the method comprising:
   maintaining a database of network entity attribute information, the database including attributes of each entity of a plurality of entities of a network;
   presenting the attributes of each entity of the plurality of entities in the network as options in defining a condition of a network policy for the network, wherein the plurality of entities include a set of one or more entities that matches the condition of the network policy;
   receiving user input that includes a selected option of the options, wherein the selected option corresponds to a given attribute in the attributes of the plurality of entities, wherein the user input includes a given value for the given attribute, and wherein the given attribute and the given value at least partly define the condition of the network policy; and
   applying the network policy to the set of one or more entities based on the condition of the network policy.

2. The method defined in claim 1, wherein the plurality of entities comprise host devices, the method further comprising:

presenting the condition for identifying one or more host devices in the host devices that match the condition of the network policy, wherein the user input selects the presented condition for defining the network policy.

3. The method defined in claim 2, wherein the condition comprises the given value of the given attribute and a relationship to the given value and wherein the identified one or more host devices have one or more values for the given attribute that match the relationship to the given value.

4. The method defined in claim 3 further comprising:
   presenting a plurality of actions to be performed when applying the network policy, wherein the user input selects a given action from the plurality of actions for defining the network policy.

5. The method defined in claim 4 further comprising:
   presenting a set of values corresponding to the given action, wherein the user input selects a given value from the set of values and wherein applying the network policy comprises performing the given action using the given value selected from the set of values.

6. The method defined in claim 5, wherein the given action comprises an assignment to a virtual local area network (VLAN), an assignment to an access control list (ACL), an assignment to a pre-defined segment, or an output to supplemental equipment.

7. The method defined in claim 1, wherein the condition is a network-level condition and the attributes of the plurality of entities comprise network attributes.

8. The method defined in claim 1, wherein the condition is a user-level condition and the attributes of the plurality of entities comprise user attributes.

9. The method defined in claim 1, wherein the condition is a device-level condition and the attributes of the plurality of entities comprise device attributes.

10. The method defined in claim 1, wherein the attributes of the plurality of entities are obtained by a network management server from external equipment.

11. The method defined in claim 1, wherein the attributes of the plurality of entities are presented via a user interface and wherein the user input is received via the user interface.

12. The method defined in claim 11, wherein the user interface comprises a graphical user interface on a web browser application.

13. A method for network policy configuration, the method comprising:
   presenting, via a user interface, a first set of options that configures a network;
   presenting, via the user interface, a second set of options that defines one or more conditions for configuring a network policy for the network, the one or more conditions specifying one or more entities of the network to which the network policy is applied;
   presenting, via the user interface, a third set of options that defines one or more actions for configuring the network policy, wherein the one or more actions are performed as part of applying the network policy;
   receiving, via the user interface, user input of a first selection from the first set of options, a second selection from the second set of options, and a third selection from the third set of options; and
   applying the network policy based on the second and third selections.

14. The method defined in claim 13, wherein the first set of options comprises a first option to configure a wired network and a second option to configure a wireless network.

15. The method defined in claim 13, wherein the second set of options comprises a first option to select one or more attributes for the one or more conditions and a second option to select one or more values for the one or more attributes.

16. The method defined in claim 13, wherein the third set of options comprises a first option to select a given action of the one or more actions and a second option to select a corresponding value associated with the given action.

17. The method defined in claim 13 further comprising:
maintaining network entity attribute information, wherein at least some options in the first, second, or third sets of options present some of the maintained network entity attribute information as selectable options.

18. A method of defining a network for network policy configuration, the method comprising:
presenting, via a user interface, a plurality of selectable options, wherein the plurality of selectable options comprise a first option to configure a wired network and a second option to configure a wireless network;
receiving, via the user interface, user input to configure a new network, wherein the user input comprises a selection of the first option or the second option from the plurality of selectable options;
based on the user input comprising the selection of the first option and the new network being a wired network, identifying a set of values for wired network attributes and configuring the new network as the wired network using the set of values for the wired network attributes; and
based on the user input comprising the selection of the second option and the new network being a wireless network, identifying a set of values for wireless network attributes and configuring the new network as the wireless network using the set of values for the wireless network attributes.

19. The method defined in claim 18, wherein the wired network attributes and the wireless network attributes comprise standards-compliant attributes.

20. The method defined in claim 19, wherein the standards-compliant attributes comprise Remote Authentication Dial-In User Service (RADIUS) protocol attributes.

* * * * *